Figure 1:
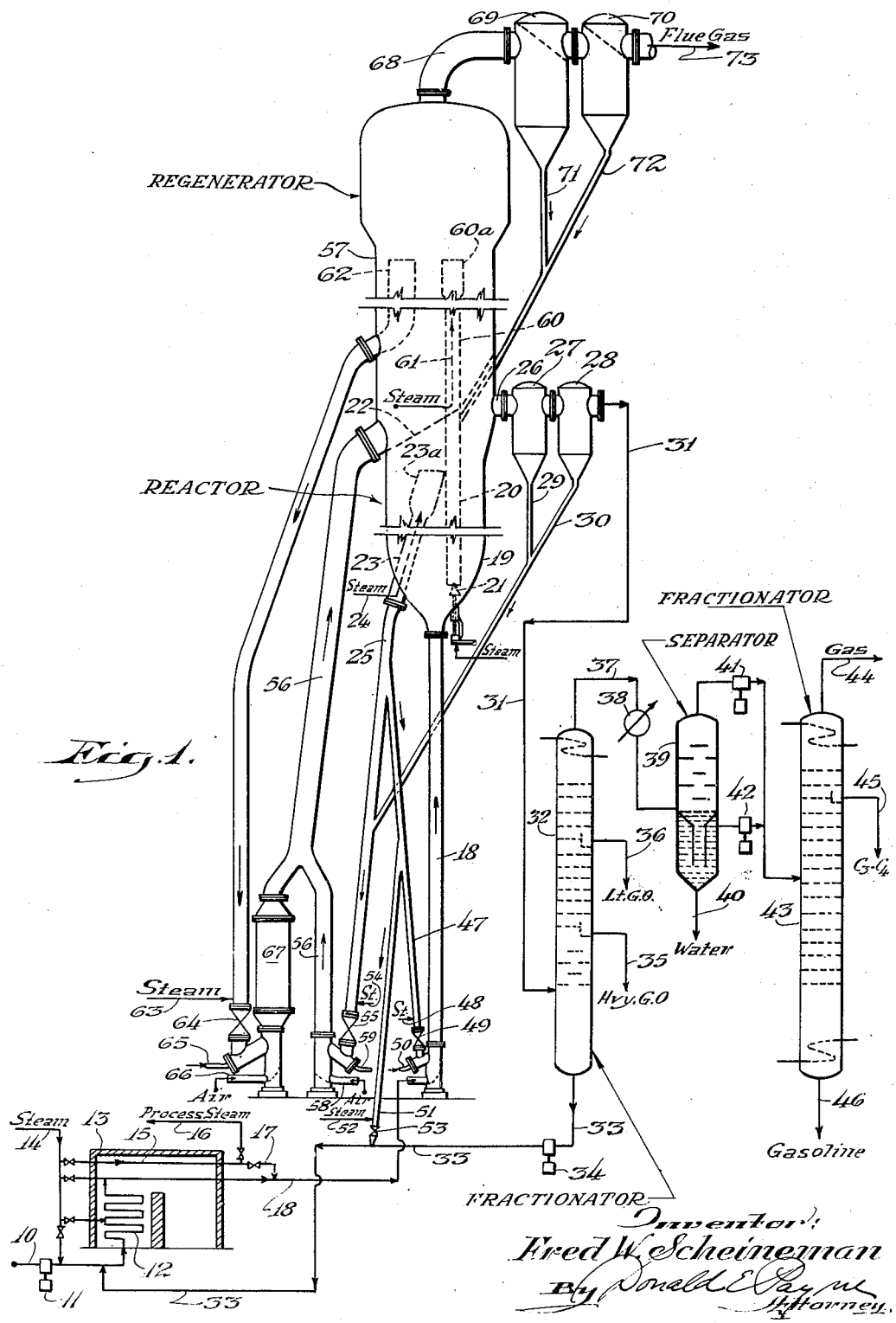

Feb. 8, 1944. F. W. SCHEINEMAN 2,341,193
CATALYTIC HYDROCARBON CONVERSION SYSTEM
Filed July 3, 1941 2 Sheets-Sheet 2

Patented Feb. 8, 1944

2,341,193

UNITED STATES PATENT OFFICE 2,341,193

CATALYTIC HYDROCARBON CONVERSION SYSTEM

Fred W. Scheineman, Chicago, Ill., assignor to Standard Oil Company, Chicago, Ill., a corporation of Indiana Application July 3, 1941, Serial No. 400,957

20 Claims. (Cl. 196—52)

This invention relates to an improved catalytic hydrocarbon conversion system and it pertains more particularly to a unitary system for a fluidized, powdered catalyst which requires periodic regeneration.

The powdered or fluid-type catalytic hydrocarbon conversion system may employ a wide variety of catalysts, charging stocks, operating conditions, etc., for effecting hydrogenation, dehydrogenation, desulfurization, isomerization, reforming, alkylation, gas reversion, polymerization, synthesis, aromatization, isoforming, etc., but it is particularly applicable to the catalytic cracking of gas oils and heavier hydrocarbons for the production of high quality motor fuels.

An object of my invention is to provide improved methods and means for removing catalyst from a reactor, i. e., from a conversion chamber or a regeneration chamber. A further object is to minimize expansion difficulties, particularly in connection with standpipes which are employed for obtaining the necessary pressure differentials required for transferring catalyst from one zone to another. A further object is to provide a unitary conversion-regeneration system which will be less expensive to fabricate and more efficient in operation than any prior system of this type.

A further object of the invention is to provide a simpler and more efficient method and means for separating catalyst from gases or vapors in a reactor and for minimizing the energy required to transfer catalyst from one reactor to another reactor. Other objects of the invention will be apparent as the detailed description proceeds.

In practicing my invention I may directly superimpose one reactor over another or I may mount reactors side by side in very close proximity to each other and in either case I may employ a common wall between the two reactors. (The term "reactor" as used in this specification is expressly defined as including both conversion chamber and regeneration chamber unless the context requires a different interpretation.)

An important feature of the invention is the use of floating standpipes, i. e., standpipes which extend upwardly or downwardly or both upwardly and downwardly from a single point of support. The standpipes may be from 25 to 50 feet in height. If a standpipe welded in the base of the reactor extends upwardly therein for a distance of 25 or 30 feet, no allowance will have to be made for expansion of that portion of the standpipe since the upper end thereof is free to move, i. e., is floating, and is not subject to stresses or strains due to expansion or contraction. A standpipe which extends downwardly from the top of a reactor may similarly be described as "floating." In the embodiments of my invention wherein the top of one reactor constitutes the bottom of another reactor a standpipe may extend upwardly in the upper reactor and downwardly in the lower reactor from the intermediate support and thus entirely avoid any expansion problems.

Standpipes may lead from one reactor to another at approximately the point of reactor support so that here again the use of floating standpipes will minimize and, in fact, substantially eliminate the expansion problem.

A feature of my invention is the withdrawal of catalyst from the upper part of a reactor and directly from a dense turbulent suspended catalyst phase. The catalyst in the case of cracking is preferably of the silica-alumina or silica-magnesia type. This catalyst may be prepared by the acid treating of natural clays, such as bentonite, or by synthetically preparing a silica-alumina or silica-magnesia mixture. An excellent catalyst may be prepared by ball-milling silica hydrogel with alumina or magnesia using about 2 to 30%, for example about 15 or 20%, of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing, after which it is dried and heated as in the previous example. The silica-alumina catalyst may be rendered more stable at high temperatures by the addition thereto of zirconia in either smaller or larger amounts than alumina. The ball-milled silica-magnesia catalyst may be improved by preheating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition or preparation of catalyst per se and no further description of the catalyst is, therefore, necessary.

The catalyst in this specific example is in powdered form with a particle size of about 1 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. Higher gas or vapor velocities may be required for coarser catalyst particles, but these particles may be of such size as to be retained on a 400, 300, 200, 100, 50 or even 10 mesh screen.

The density of the catalyst particles per se may be as high as 160 pounds per cubic foot but the bulk density of catalyst which has settled for 5 or 10 minutes will usually be from 25 to 40 pounds per cubic foot. With slight aeration, i. e., with vapor velocities of about .05 to .5 foot per second, the bulk density of 300–400 mesh catalyst will be about 20 to 30 pounds per cubic foot. With vapor velocities of about 1 to 2 or 3 feet per second the bulk density of such catalyst may be about 10 to 20 pounds, for example, about 15 to 18 pounds per cubic foot. It is at such gas or vapor velocities that powdered catalyst is maintained in the dense, turbulent suspended catalyst phase. At higher vapor velocities or in settling zones the bulk density of catalyst may be less than 5 pounds per cubic foot or even less than 1 pound per cubic foot and it is under such conditions that the catalyst is said to be in the light, dispersed phase. The dilute phase may contain as little as 50 grains per cubic foot. Generally speaking, the catalyst in the dense, turbulent suspended catalyst phase has a bulk density of 1 to 5 and preferably of at least 10 pounds per cubic foot greater than the bulk density of the light, dispersed catalyst phase. Aerated catalyst in the overflow pipes or standpipes, even while undergoing stripping, may have the bulk density of 20 to 30 or more pounds per cubic foot, i. e., at least 1 and preferably 5 pounds per cubic foot heavier than the dense, turbulent suspended catalyst phase.

In practicing my invention I withdraw catalyst directly from the upper part of a dense turbulent suspended catalyst phase through one or more overflow pipes or standpipes which may be of the suspended or floating standpipe type hereinabove described. The catalyst in the standpipe is in the dense aerated phase and is, therefore, of greater bulk density than the catalyst in the dense, turbulent suspended catalyst phase. I utilize this difference in bulk density to provide the catalyst head in the standpipes necessary for transferring catalyst from one reactor to another reactor and for preventing the flow of gases from one reactor to another. Catalyst fines are centrifugally separated from gases or vapors leaving each reactor and are introduced into the main body of catalyst in the reactor or into a body of catalyst which has been withdrawn from one reactor for introduction into another reactor. Other features of the invention will be apparent from the following detailed description.

Figure 2:
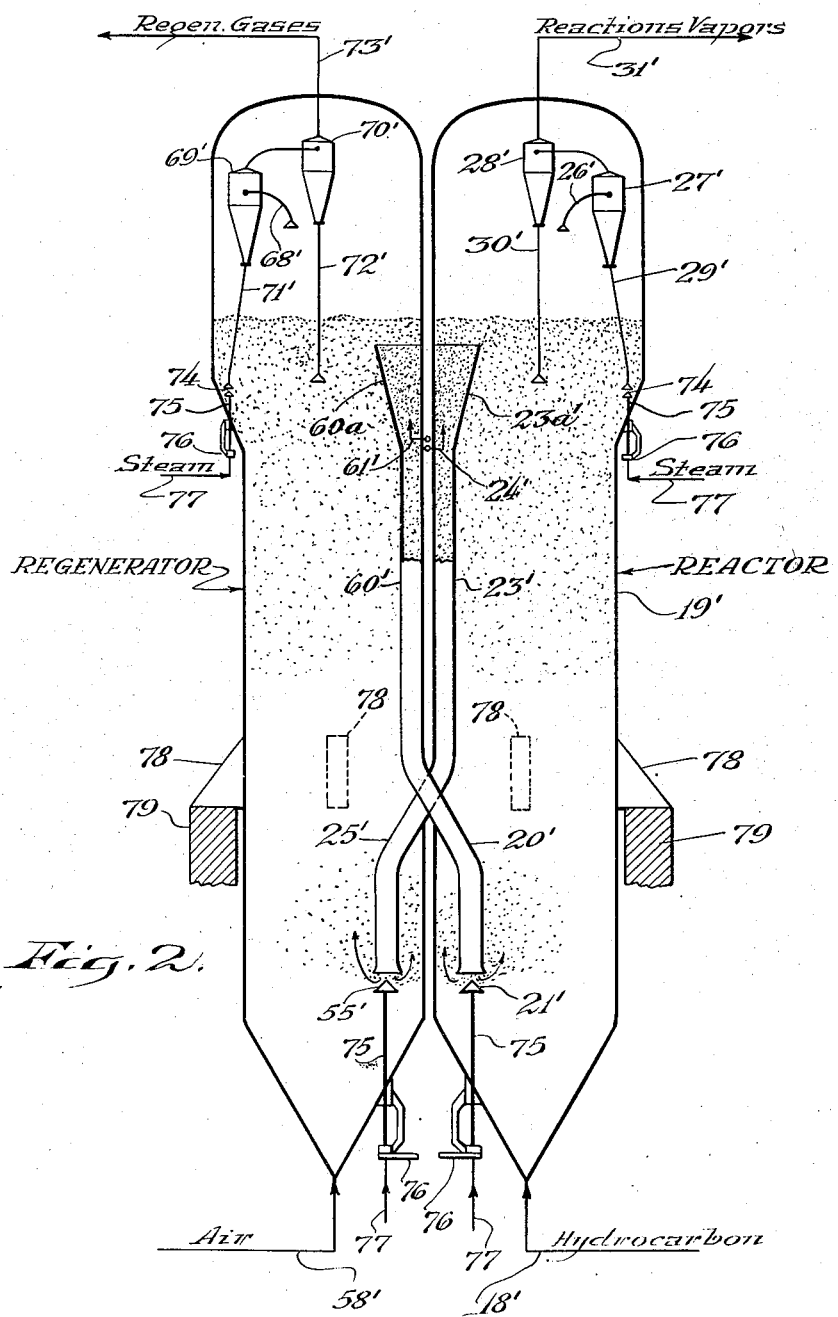

In the accompanying drawings which constitute a part of this disclosure and in which similar parts are designated by like reference characters:

Figure 1 is a schematic flow diagram of a catalytic cracking unit of the superimposed reactor type; and Figure 2 is a schematic flow diagram of a catalytic cracking system employing a side by side reactor arrangement.

To illustrate my invention I will describe a system for the catalytic cracking of gas oil or heavier hydrocarbons, such as reduced crude, by means of a silica-alumina catalyst as hereinabove described, i. e., a catalyst having a particle size of about 10 to 100 microns. Charging stock from line 10 is introduced by pump 11 into coils 12 of pipe still 13. Steam from line 14 may be introduced with the charging stock, or introduced at one or more intermediate points in the pipe still, or superheated in coil 15. A part of this superheated steam may be passed through line 16 to various parts of the system for use as process steam, i. e., for aeration, stripping, catalyst transfer, etc. Another part of the superheated steam may be introduced through line 17 into transfer line 18 which leads to the base of conversion reactor 19.

Reactor 19 should be designed to provide a vertical vapor velocity therein of about 1 to 3 feet per second at a temperature of about 800 to 1050° F., preferably about 900 to 1000° F., and at a pressure of about atmospheric to 50 pounds per square inch, for example, about 15 pounds per square inch at its base. The charging stock may be heated in the pipe still to this reaction temperature or it may be simply preheated and only partially vaporized in the pipe still, at least a substantial part of the heat of cracking and, if desired, the heat required for completing the vaporization being supplied by the sensible heat contained in the hot regenerated catalyst which is introduced into the reactor from the base of standpipe 20 in amounts regulated by valve 21.

The ratio of introduced catalyst to introduced oil in conversion reactor 19 may range from about 1:1 to about 15:1, depending upon the activity of the catalyst, the amount of heat which it is to supply to the conversion reactor and the desired catalyst residence time in this reactor. Where gas oil is employed as a charging stock the catalyst-to-oil ratio may be about 4:1 or 5:1 because substantially complete vaporization of the gas oil can easily be obtained in the pipe still. When reduced crude is charged into the system it may be desirable to employ much larger catalyst-to-oil ratios in order to supply at least a considerable part of the heat of vaporization as well as the heat of cracking by the sensible heat contained in the added catalyst.

As above stated, the up-flowing vapors in the conversion reactor are of such velocity as to maintain a dense turbulent suspended catalyst phase throughout the conversion zone. The conversion reactor may be about 30 or 40 feet in height and it may be provided with an enlarged upper section to facilitate the settling of catalyst out of the dilute phase into the dense turbulent suspended catalyst zone. This conversion reactor may be provided with a curved or inclined top wall 22 which also serves as a bottom wall for the regenerator as will be hereinafter described. A "floating" standpipe 23 extends from a point near the base of the conversion reactor to a point adjacent the top of the desired conversion zone. The upper part 23a of this "floating" standpipe may be enlarged to provide for stripping by steam introduced through line 24. This standpipe may extend upwardly in the conversion reactor for a distance of 20 or 25 feet and it may expand or contract without setting up any strains in the system which might require the use of expansion joints. Catalyst from the dense turbulent suspended catalyst phase overflows into the enlarged upper section 23a of this standpipe and is stripped with steam therein before being withdrawn through the depending portion 25 of the standpipe.

Any catalyst fines which leave the top of the conversion reactor through line 26 are knocked out of the cracked vapors in cyclone separators 27 and 28 and returned through dip legs or standpipes 29 and 30 to the depending portion 25 of the main standpipe containing spent catalyst. The vapors from line 31 pass to a combination fractionator and scrubber 32. Any residual particles are concentrated in the scrubber bottoms and recycled through line 33 by means of pump 34 for admixture with charging stock entering the pipe still coils. Heavy gas oil may be withdrawn through line 35, light gas oil may be withdrawn through line 36 and the gasoline and lighter hydrocarbons together with steam may be withdrawn from the top of this tower through line 37. This overhead may be cooled in cooler 38, introduced into separator 39 which, with condensed water, may be withdrawn through line 40. Gases from the separator may be compressed by compressor 41 and condensed hydrocarbons pumped by pump 42 to a pressure of about 135 to 150 pounds per square inch and introduced into high pressure fractionating column 43 from which light gases may be taken overhead through line 44, a $C_3$—$C_4$ fraction may be withdrawn through line 45 and gasoline may be withdrawn from the base through line 46. The above fractionation system has been diagrammatically illustrated and it should be understood that any suitable arrangement of fractionators, absorbers, stabilizers, etc., may be used to effect the desired product separation.

When it is desired to recycle the portion of the spent catalyst directly to the reactor such recycling may be effected by a branch standpipe 47 which may be aerated by steam introduced through line 48. The amount of recycled catalyst may be controlled by valve 49 and this recycled catalyst may be injected into transfer line 18 by means of steam or other gas introduced through line 50.

When it is desired to recycle spent catalyst through the heater coils for preventing coke deposits therein such catalyst may be introduced through branched standpipe 51 into line 33. Branched standpipe 51 may be aerated by steam introduced through line 52 and the amount of catalyst discharged from this standpipe may be regulated by valve 53.

The catalyst in standpipe 25 is aerated by steam introduced through line 54 and this catalyst is introduced through valve 55 into an up-flowing air stream in conduit 56 which leads to the base of regenerator 57. Air may be introduced into line 56 through line 58. Valve 55 may discharge directly into this air stream or catalyst may be injected into the stream by means of steam or other gas introduced through line 59.

The curved or inclined bottom wall 22 of the regenerator is the top wall of the conversion reactor as hereinabove described. The regenerator may be of slightly larger diameter and of greater height than the conversion reactor and it may be provided with an enlarged top section to facilitate the settling of catalyst particles out of the upper dilute catalyst phase. One portion of the regenerated catalyst flows from the top of the dense turbulent suspended catalyst zone into upwardly extending standpipe 60 which is an extension of standpipe 20. The upper part of standpipe 60 is provided with an enlarged section 60a to permit the stripping of oxygen containing gases out of the catalyst before the catalyst reaches the conversion reactor. The stripping steam line 61 may enter the regenerator at a point near the base thereof or may be provided with suitable bends for avoiding any differential expansion difficulties. Aeration steam may be supplied at the base of depending section 20 of this standpipe by a similar line but is preferably introduced through closure member 21 itself as will be more fully described in connection with Figure 2. From the above description it will be seen that the standpipe consisting of upper section 60 and lower section 20 extends through the dividing wall 22 and is supported by this dividing wall so that both its upper and lower ends are "floating" and, therefore, do not give rise to expansion problems. The unitary system may be supported at about the junction between the conversion reactor and the regenerator, or at any higher or lower point.

The regenerator may be operated at a slightly higher pressure than the conversion reactor or it may be operated at substantially the same pressure since the density of aerated catalyst in standpipe 20—60 is greater than the density of the dense turbulent suspended catalyst phase through which this standpipe extends. Thus the pressure at the base of standpipe 20 may be from 1 to 5 pounds per square inch greater than the pressure in the reactor at this point. Closure member 21 is designed to automatically close and seal the lower end of the standpipe if this pressure differential becomes less than about 1 pound per square inch because it is extremely important that hydrocarbon vapors from the reactor should be prevented from reaching the regenerator, and vice versa.

If more heat is liberated in the regenerator than can safely be stored in the catalyst without exceeding desired temperature limits of about 1000 to 1050° F., it may be necessary to provide means for removing heat from the regenerator. Such heat may be removed by the provision of heat exchange tubes in the regenerator, such tubes preferably being mounted around the periphery thereof so that they will not interfere with the dense turbulent suspended catalyst phase phenomenon. An alternative method of temperature control is to recycle this catalyst through a cooler and to return the cooled catalyst to the regenerator. Thus catalyst may be removed from the upper part of the dense turbulent suspended catalyst phase in the regenerator through standpipe 62 which is aerated by air or steam introduced through line 63. Catalyst from the base of standpipe 62 may be introduced in amounts regulated by valve 64 into a stream of air introduced through lines 65 or 66 or both 65 and 66. The catalyst is carried by this air upwardly through heat exchanger 67 and thence returned through line 56 along with spent catalyst to the base of the regenerator. The amount of air introduced through lines 58, 59, 65 and 66 must be sufficient to effect the desired combustion and should be sufficient to provide for a vertical gas velocity in the regenerator of about 1 to 3 feet per second in order that the desired dense, turbulent suspended catalyst phase may be maintained in this regenerator up to the top level of standpipes 60 and 62. Most of the catalyst drops out of the dilute regeneration gas phase in the top of the regenerator but a small amount of the catalyst fines will be carried overhead through line 68. I, therefore, provide cyclone separators 69 and 70 for recovering such catalyst fines and I return these catalyst fines through dip legs or standpipes 71 and 72 to the regenerated catalyst stream flowing downwardly in standpipe 60—20. It will be understood, of course, that aeration and stripping steam may be introduced in standpipes 29, 30, 71 and 72 as well as in the other standpipes hereinabove described. The flue gas from line 73 may be passed through suitable heat exchangers or turbines for recovering heat or energy therefrom and catalyst dust may be separated therefrom by means of an electrostatic precipitator for reintroduction into the system with coarser catalyst or for reworking into catalyst of desired particle size.

In Figure 2 I have illustrated a modification of my invention wherein the reactors are mounted side by side. Upwardly extending standpipe 23' in reactor 19' may be an independent conduit as in Figure 1 or it may be a welded channel along the side of the reactor, this latter expedient making it possible to introduce stripping steam through line 24' directly through that portion of the reactor wall which, in fact, constitutes a portion of the standpipe wall. Similarly, standpipe 60' in the regenerator may be either a separate conduit or a channel welded to the regenerator wall. The lower end of standpipe 60' communicates directly with the upper end of standpipe 20' by a short pipe section which is welded in the reactor and regenerator walls at approximately the level at which these chambers are supported. I may employ a conversion reactor and regenerator with a common wall therebetween or with separate walls as shown. Either the reactor or regenerator may expand or contract without setting up any undue stresses in the standpipe or in the welded joints.

In the modification of Figure 2 I not only transfer dense phase catalyst directly from the top of the dense turbulent suspended catalyst phase in the regenerator to the lower part of such phase in the reactor but I also transfer catalyst directly from the top of the dense turbulent suspended catalyst phase in the reactor to the lower part of the dense turbulent suspended catalyst phase in the regenerator. In other words, I avoid the necessity of extending any standpipes below the bottom of the reactor and regenerator. Standpipe 25' communicates with standpipe 23' in the same way that standpipe 20' communicates with standpipe 60'. All of the welded connections are at approximately the level at which these two chambers are supported.

In Figure 2 I have illustrated internal cyclones for knocking back catalyst from the dilute catalyst phase in the upper part of the reactors to a point below the level of the dense turbulent suspended catalyst phase. The dip legs from these cyclones may discharge into the standpipe hoppers or into the standpipes below the hoppers as described in Figure 1 or they may simply extend below the level of the dense turbulent suspended catalyst phase as illustrated in Figure 2. Valve closures 74 may be provided at the base of each cyclone dip leg.

Valve closures 21, 21', 55' and 74 are mounted on hollow shafts 75 which extend through the chamber wall to external control means 76. Steam or other aerating gas may be introduced through the hollow valve shaft or steam through line 77 and may be discharged from ports at the upper end of the valve closures for aerating the standpipes, dip legs, etc., when the valves are closed or nearly closed and for dispersing catalyst into the chamber when the valves are in open position and the catalyst is freely flowing through the standpipes or dip legs.

Valves 21, 55, 21' and 55' are provided with automatic means for instantaneously closing them when the pressure at the base of the respective standpipes is not at least 1 pound per square inch greater than the pressure in the reactor or regenerator at the point of discharge. Since the bulk density of catalyst in the standpipes is higher than the bulk density of the dense turbulent suspended catalyst phase and since the reactor and regenerator may be about 30 or 40 feet high, this system may be designed and operated so that the pressure at the base of the standpipes is about 2 to 3 pounds per square inch greater than the pressure in the respective reactor or regenerator at the point of discharge provided, of course, that sufficient catalyst is added to the system to maintain the necessary catalyst inventory.

The reactor and regenererator may be supported by bracket 78 resting on concrete piers or supports 79 and these supporting brackets are at approximately the standpipe cross-over level so that differential expansion problems are practically eliminated. If desired, of course these cross-over lines and reactor supports may be at a higher or lower level than illustrated in Figure 2. Also, the valves 21' and 55' may be external valves in the short section of the standpipes between the adjacent reactors in which case stripping steam may be introduced into the standpipes immediately above the valves. The catalyst may thus be introduced into the lower part of the adjacent reactor while it remains in the dense aerated phase or it may be injected into the other reactor by means of a suitable gas or vapor. By having the reactor supports at approximately the same level as the cross-over standpipes either reactor may expand or contract without setting up any undue strains due to differential expansion.

While I have described specific embodiments of my invention it should be understood that my invention is not limited to these particular details or modifications since many alternative operating conditions and modifications will be apparent to those skilled in the art from the above description.

I claim:

1. In a hydrocarbon conversion system a unitary conversion reactor and regenerator reactor with a common wall therebetween, a standpipe extending through said common wall and supported thereby with its upper end communicating with the upper part of one reactor and its lower end communicating with the lower part of the other reactor and means for regulating the flow of catalyst through said standpipe.

2. The apparatus of claim 1 wherein the standpipe is enlarged at its upper end.

3. In apparatus for catalytic conversion, a first contacting chamber, means for introducing gas or vapor at a low point in said chamber at such a rate as to maintain a dense turbulent suspended catalyst phase therein, means for removing gases and vapors from the upper part of said chamber, separate means in said chamber for removing powdered catalyst directly from said dense turbulent suspended catalyst phase, means for stripping undesirable fluids from the removed catalyst, a second contacting chamber, means for introducing a gas or vapor at a low point of the second chamber at such a rate as to maintain a dense tubulent suspended catalyst phase therein, means for removing gases and vapors from the upper part of said second chamber, means for mounting said first chamber immediately adjacent the second chamber and in such a manner that the chambers are in constant alignment at at least one point during all temperature fluctuations therein, a conduit extending from said catalyst removal means in the first chamber at said point of constant alignment for introducing dense phase stripped catalyst material directly from said first chamber to said second chamber and means for removing catalyst directly from the dense phase in the second chamber and returning said catalyst to said first chamber.

4. The apparatus of claim 3 wherein the first chamber is mounted above the second chamber with a wall therebetween and wherein said conduit extends from the upper chamber through said wall to the dense phase of second chamber.

5. The apparatus of claim 3 wherein the second chamber is mounted at one side of the first chamber and wherein the conduit extends from the first chamber to the second chamber at substantially the level at which said chambers are supported.

6. In a system for the catalytic conversion of hydrocarbons by means of a powder catalyst, a vertical reactor, a vertical regenerator superimposed above said reactor, a standpipe extending from said regenerator through an upper wall of the reactor to a low point in the reactor, means for regulating the flow of powdered catalyst in the standpipe, means for introducing a gas or vapor at a low point in the reactor at such a rate as to maintain powdered catalyst in a dense turbulent suspended phase therein, means for removing catalyst from said reactor, means for stripping the removed catalyst, means for introducing the stripped catalyst into said regenerator, means for introducing air at a low point in said regenerator, means for removing reaction products from the upper part of the reactor and means for removing regeneration gases from the upper part of the regenerator.

7. The apparatus of claim 6 wherein the standpipe extends from an intermediate level in the regenerator to a low level in the reactor.

8. The apparatus of claim 6 wherein the means for removing catalyst from the reactor includes a standpipe extending upwardly therein and downwardly therefrom.

9. An apparatus for converting hydrocarbon oils by the aid of suspended solid catalysts which comprises a regeneration chamber superimposed on a reaction chamber and in direct heat conducting contact therewith, means for introducing air into said regeneration chamber, means for introducing catalyst into said regeneration chamber, a gas line for discharging regeneration gases from said regeneration chamber, means for downwardly withdrawing catalyst from an intermediate point in said regeneration chamber, a vertically disposed elongated seal leading from the base of said regeneration chamber to said reaction chamber, means for maintaining a column of catalyst within said seal to prevent vapor communication between said reaction chamber and said regeneration chamber, means for discharging catalyst from said seal into said reaction chamber, means for introducing hydrocarbon vapors into said reaction chamber whereby catalyst discharged from said seal is suspended in said reaction chamber, means for downwardly withdrawing catalyst from an intermediate point in said reaction chamber, means for stripping hydrocarbon vapors from said withdrawn catalyst and means for returning said withdrawn catalyst to said regeneration chamber.

10. In a hydrocarbon conversion system a unitary first reactor and second reactor with a common wall therebetween, a conduit extending through said common wall and supported thereby with one end of said conduit communicating with an intermediate point in the first reactor and the other end communicating with an intermediate point near the base of the second reactor whereby catalyst may flow from the first reactor to the second reactor through said conduit, means for introducing an aerating gas into said conduit and for regulating the flow of catalyst therethrough, means for transferring catalyst from the second reactor back to the first reactor and means for introducing gases or vapors at the lower part of each reactor and for removing gases or vapors from the upper part of each reactor.

11. The system of claim 10 wherein the first reactor is superimposed above the second reactor.

12. The system of claim 10 wherein the means for introducing an aerating gas is the sole means for regulating the flow of catalyst through said conduit.

13. In a catalyst conversion apparatus a first reactor, a second reactor, a conduit leading from an upper intermediate part of the first reactor to a lower intermediate part of the second reactor, said conduit leaving the first reactor and entering the second reactor at a point substantially free from structural strains due to expansion or contraction, means for transferring catalyst from the second reactor back to the first reactor, means for introducing gases or vapors at a low point in each reactor and means for removing gases or vapors from an upper part of each reactor.

14. The apparatus of claim 13 wherein the means for transferring catalyst from the first reactor to the second reactor includes a conduit with one end communicating with an intermediate point in the second reactor and the other end communicating with a low point in the first reactor.

15. The apparatus of claim 13 wherein the first reactor is superimposed above the second reactor.

16. The apparatus of claim 13 wherein the first reactor is mounted adjacent the side of the second reactor.

17. In apparatus for catalytic conversion a vertical contacting chamber, means for introducing gas or vapor at a low point in said chamber at such a rate as to maintain a dense turbulent suspended catalyst phase therein, means for removing gases and vapors from the upper part of said chamber, separate means including a standpipe extending upwardly in said chamber to a point below the level of the dense turbulent suspended catalyst phase therein for removing catalyst directly from said dense turbulent suspended catalyst phase, said standpipe being of sufficient cross-sectional area to serve as a stripping chamber and means for introducing a stripping gas into said standpipe.

18. In a contacting system for handling powdered solids, a first contacting chamber, means for passing gases or vapors upwardly in said chamber at such a rate as to maintain a dense turbulent suspended solids phase therein which is superimposed by a light dispersed solids phase, means for withdrawing dense phase solids directly from the dense turbulent suspended solids phase, means for maintaining the withdrawn solids in aerated condition, a second contacting chamber, means for passing gases or vapors upwardly therein at such a rate as to maintain a second dense turbulent suspended solids phase superimposed by a light dispersed solids phase, means for introducing into this second dense turbulent solids phase the aerated solids from the first dense turbulent suspended solids phase, means for withdrawing dense phase solids directly from the second dense turbulent suspended solids phase, means for maintaining the withdrawn solids in aerated condition, means for returning the last-named aerated solids to said first-named dense turbulent suspended solids phase, means at the top of each chamber for separating solids from removed gases or vapors and for returning said separated solids to dense phase solids which have been withdrawn from that chamber and means including an internal standpipe extending upwardly into at least one of said dense turbulent suspended solids phases and terminating below the upper level of said phase for removing dense phase solids therefrom.

19. In a fluid catalyst system a cylindrical reactor, an internal standpipe extending upwardly in said reactor and downardly through the base thereof, means for introducing powdered catalyst into said reactor, means for introducing a suspending gas or vapor at a lower point in said reactor at such a rate as to maintain a dense turbulent suspended catalyst phase in said reactor and around said standpipe, a catalyst settling section at the upper part of said reactor and above the top of said standpipe, means for centrifugally removing catalyst particles from gases or vapors leaving the upper settling section and for introducing the removed catalyst particles into said standpipe, means for aerating and stripping catalyst in said standpipe and means for withdrawing catalyst from the base of said standpipe.

20. In apparatus for catalytic conversion, a vertical contacting chamber, means for introducing gas or vapor at a low point in said chamber at such a rate as to maintain a dense turbulent suspended catalyst phase therein, means for removing gases and vapors from the upper part of said chamber, separate means including a standpipe extending upwardly in said chamber to a point below the level of the dense turbulent suspended catalyst phase therein for removing catalyst directly from said dense turbulent suspended catalyst phase, means for separating catalyst from gases and vapors removed from the top of said chamber and means for returning the separated catalyst to said standpipe.

FRED W. SCHEINEMAN.

CERTIFICATE OF CORRECTION.

Patent No. 2,341,193.　　　　　　　　　　　　　February 8, 1944.

FRED W. SCHEINEMAN.

It is hereby certified that error appears in the printed specification of the above numbered patent requiring correction as follows: Page 6, second column, line 3, claim 19, for the word "lower" read --low--; and that the said Letters Patent should be read with this correction therein that the same may conform to the record of the case in the Patent Office.

Signed and sealed this 21st day of March, A. D. 1944.

Leslie Frazer

(Seal)　　　　　　　　　　　　　　　　Acting Commissioner of Patents.